(12) United States Patent
Aoki

(10) Patent No.: US 6,580,928 B1
(45) Date of Patent: Jun. 17, 2003

(54) HANDY PHONE

(75) Inventor: Eriko Aoki, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/521,543

(22) Filed: Mar. 9, 2000

(30) Foreign Application Priority Data

Mar. 9, 1999 (JP) .......................................... 11-061836

(51) Int. Cl.⁷ .............................. H04B 1/38; H04M 1/00
(52) U.S. Cl. ...................... 455/566; 455/462; 455/465; 455/550; 455/556; 455/575
(58) Field of Search ................................ 455/462, 465, 455/414, 419, 550, 556, 566, 575

(56) References Cited

U.S. PATENT DOCUMENTS

| | | | |
|---|---|---|---|
| 5,396,264 A | * 3/1995 | Falcone et al. | 455/146 |
| 5,680,312 A | * 10/1997 | Oshizawa et al. | 364/444 |
| 5,821,936 A | 10/1998 | Shaffer et al. | |
| 6,012,087 A | * 1/2000 | Freivald et al. | 709/218 |
| 6,069,625 A | * 5/2000 | Nielsen | 345/334 |
| 6,125,287 A | * 9/2000 | Cushman et al. | 455/456 |
| 6,144,863 A | * 11/2000 | Charron | 455/566 |
| 6,188,406 B1 | * 2/2001 | Fong et al. | 345/348 |

FOREIGN PATENT DOCUMENTS

| | | | | |
|---|---|---|---|---|
| EP | 0 844 553 A1 | 5/1998 | | |
| EP | 0 891 066 A2 | 1/1999 | | |
| EP | 0891066 A1 | * 1/1999 | ........... | G06F/3/303 |
| JP | 1-101052 | 4/1989 | | |
| JP | 5-211564 | 8/1993 | | |
| JP | 6-350688 | 12/1994 | | |
| JP | 7-162916 | 6/1995 | | |
| JP | 8-163223 | 6/1996 | | |
| JP | 9-37348 | 2/1997 | | |
| JP | 9-200318 | 7/1997 | | |
| JP | 10-23117 | 1/1998 | | |
| JP | 10-161829 | 6/1998 | | |
| JP | 10-308975 | 11/1998 | | |
| JP | 10-312261 | 11/1998 | | |
| JP | 11-187458 | 7/1999 | | |
| JP | 2000-022788 | 1/2000 | | |

* cited by examiner

Primary Examiner—William Trost
Assistant Examiner—Thang Q Le
(74) Attorney, Agent, or Firm—Scully, Scott, Murphy & Presser

(57) ABSTRACT

A handy phone of the present invention includes a menu picture displaying device for displaying a plurality of function names representative of a particular function each in the form of a menu. An inputting device inputs information designated by the user of the phone. A function name entering device allows the user to select one of the function names appearing on the menu picture and enter it on the inputting device. A function setting picture calling device calls a function setting picture corresponding to the function name selected and entered by the user. A function history storing device stores in a memory the function names attached to functions used by the user in the past and a function setting picture corresponding to the function names. A function history displaying device displays in the menu picture the function names of the functions stored in the memory as function history data. When the user selects and enters one of the function names of the function history data appearing in the menu picture on the inputting device, a function history setting picture calling device displays a function setting picture corresponding to the function name selected and set. The phone successfully reduces the number of times that the user should press buttons, and allows the user to be easily accustomed to the operation of the phone.

17 Claims, 10 Drawing Sheets

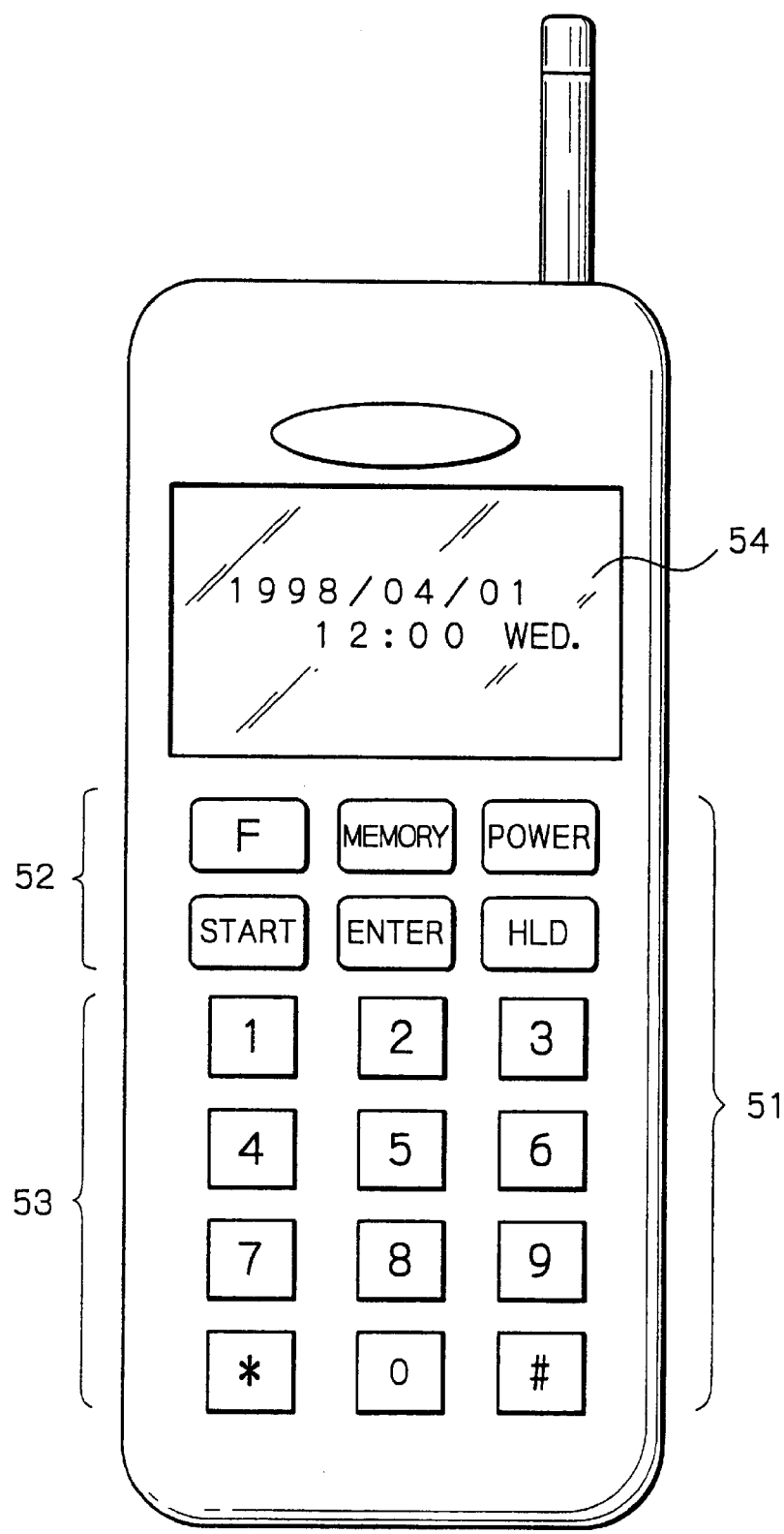

HANDY PHONE

BACKGROUND OF THE INVENTION

The present invention relates to a handy phone allowing the user of the phone to set a desired function in a setting picture called by referencing a menu picture. More particularly, the present invention is concerned with a handy phone allowing the user to again call a function used in the past with a minimum of operation of buttons arranged on the phone.

It is a common practice with a handy phone to allow the user of the phone to set desired functions via a plurality of setting pictures. Today, the number of items to be selected on the setting pictures is increasing with an increase in the number of functions open to the user, requiring the items to be input in a distributed manner. This increases the number of setting pictures to a considerable extent and makes it difficult for the user to rapidly see a setting picture matching with a desired function.

More specifically, it is extremely difficult for the user to accurately memorize all management numbers attached to a particular function each. Generally, therefore, the user uses management numbers only when calling any one of functions of frequent use. The user uses a menu function when calling a function not memorized. This, however, forces the user to operate a number of buttons arranged on the phone, depending on the desired function.

To call a desired function setting picture, the user may use either one of the following two methods (1) and (2):

(1) Directly calling a management number attached to the desired function; and (2) Calling the desired function by using a help function or a menu function.

However, as for a function that the user has not memorized, the user cannot call the desired function with the menu function without operating a number of buttons, depending on the desired function, as stated earlier. Moreover, to call the same function again, the operator must operate the above buttons all over again for searching for a desired function setting picture. While the layout of a picture and a display method may be so devised as to promote easy operation, as proposed in the past, there has not been reported an implementation for recording the history of functions used by the user in order to facilitate the call of the same function later.

I studied whether or not the user could be freed from the above troublesome operation for setting functions if a function history listing functions used in the past was stored in a memory. Also, I studied whether or not the user could rapidly reach a necessary function picture without calling pictures not used in the past if only the functions listed in the function history were called in a menu picture.

Further, I studied whether or not, only if the user memorized a method of calling the functions listed in the function history in a menu picture, the user could select a desired function in the menu picture so long as it was a function used in the past. Specifically, assume that the user calls desired one of, e. g., a hundred different functions by inputting a management number attached to the function on a button. Then, because the user does not always accurately remember the above management number, the user must repeat the same operation a hundred times in the worst case. By contrast, with the function history, the user should only select desired one of functions appearing in a menu picture as a function history and has only to repeat the same operation a minimum number of times corresponding to the number of functions listed in the function history.

Technologies relating to the present invention are disclosed in, e.g., Japanese Patent Laid-Open Publication Nos. 9-37348, 10-23117, 10-161829, 10-308975 and 10-312261.

SUMMARY OF THE INVENTION

It is therefore an object of the present invention to provide a handy phone allowing the user of the phone to call a setting picture showing a function used in the past by a minimum of operation of buttons.

A handy phone of the present invention includes a menu picture displaying device for displaying a plurality of function names representative of a particular function each in the form of a menu. An inputting device inputs information designated by the user of the phone. A function name entering device allows the user to select one of the function names appearing on the menu picture and enter it on the inputting device. A function setting picture calling device calls a function setting picture corresponding to the function name selected and entered by the user. A function history storing device stores in a memory the function names attached to functions used by the user in the past and a function setting picture corresponding to the function names. A function history displaying device displays in the menu picture the function names of the functions stored in the memory as function history data. When the user selects and enters one of the function names of the function history data appearing in the menu picture on the inputting device, a function history setting picture calling device displays a function setting picture corresponding to the function name selected and set.

BRIEF DESCRIPTION OF THE DRAWINGS

The above and other objects, features and advantages of the present invention will become more apparent from the following detailed description taken with the accompanying drawings in which:

FIG. 3 is a plan view showing a specific arrangement of buttons applicable to the present invention as well as to the conventional handy phone;

DESCRIPTION OF THE PREFERRED EMBODIMENT

To better understand the present invention, the previously stated two methods (1) and (2) of calling a desired function setting picture available with the conventional handy phone will be described specifically hereinafter (?).

Figure 1A:
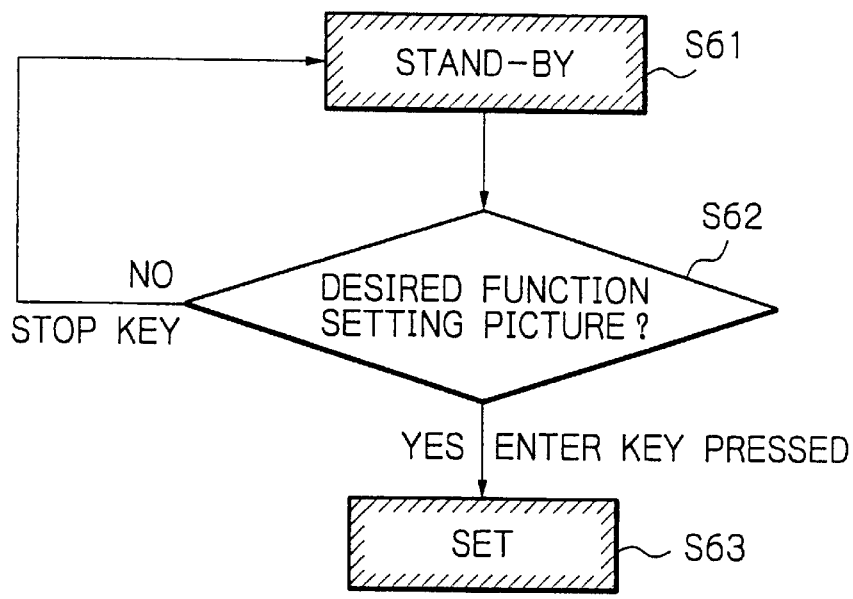
FIGS. 1A and 1B are flowcharts each demonstrating a particular procedure available with a conventional handy phone for calling a desired function setting picture.

FIG. 1A shows a specific procedure corresponding to the method (1). As shown, when a handy phone is in a stand-by state (step S61), the user of the handy phone manipulates buttons arranged on an operation panel in order to input a management number assigned to a desired function. In response, a function setting picture showing the called function appears. The user then determines whether or not the function setting picture is a desired picture (step S62). If the answer of the step S62 is YES, the user sets the above function (step S63); if otherwise (N0, step S63), the user presses a stop key with the result that the phone is restored to the stand-by state (step S61).

Figure 1B:
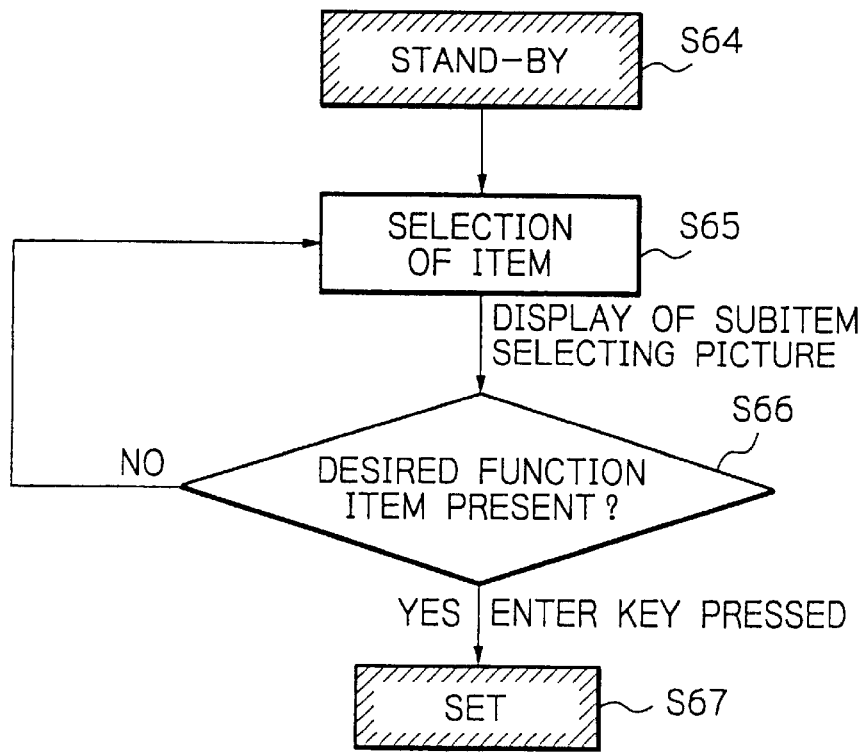

FIG. 1B shows a specific procedure corresponding to the method (2). As shown, in the stand-by state of the handy phone (step S64), the user operates the buttons of the operation panel in order to call an item menu (step S65). As a result, an item menu appears. The user then selects desired one of items listed in the item menu (step S65). In response, a subitem menu hierarchically subordinate to the item menu appears. The user, watching the subitem menu, determines whether or not it includes a desired function (step S66). If the answer of the step S66 is YES, the user sets the desired function (step S67); if otherwise (N0, step S66), the operation returns to the step S64.

Figure 2A:
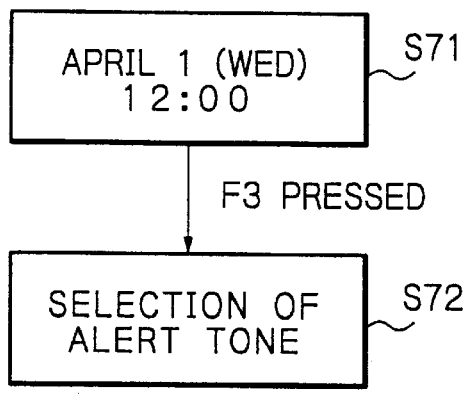
FIGS. 2A and 2B are flowcharts respectively demonstrating the procedures of FIGS. 1A and 1B more specifically.
Figure 2B:
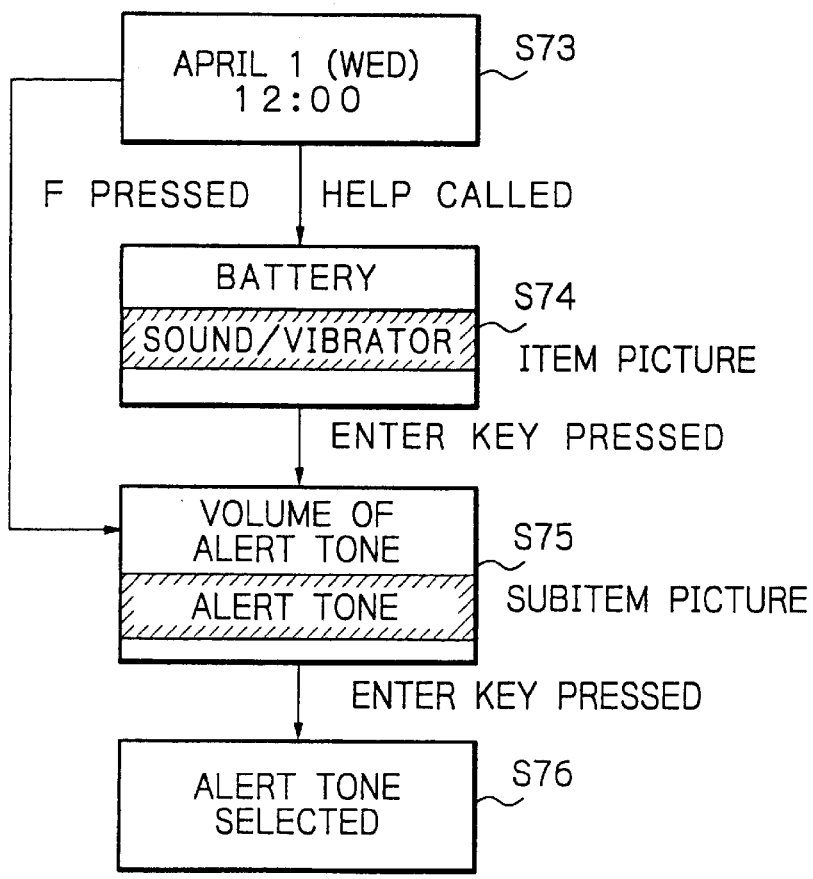

FIGS. 2A and 2B respectively demonstrate the procedures of FIGS. 1A and 1B more specifically, taking an alert tone selecting picture as an example.

However, as for a function that the user has not memorized, the user cannot call a desired function with a menu function without operating a number of buttons, depending on the desired function. Moreover, to call the same function again, the operator must operate the above buttons all over again for searching for a desired function setting picture. The conventional method of calling a function setting picture will be described more specifically with reference to FIG. 3.

As shown in FIG. 3, a handy phone includes buttons 51 made up of function buttons arranged in a function button area 52 and numeral buttons arranged in a numeral button area 53. To call a function setting picture, the operator of the phone presses a button "F" included in the function button area 52 and then inputs a management number on one of the numeral buttons included in the numeral button area 53. For example, assume that a number "3" is assigned to an alert tone selecting function. Then, when the user presses the button "F" and then the numeral button "3" (step S71, FIG. 2A), an alert tone setting picture appears on a display 54 mounted on the phone. Specifically, a controller 43 (see FIG. 4) reads data necessary for displaying the above picture on the display 54 out of a memory 47 (see FIG. 4) and causes the picture to appear on the display 54. The user, watching the picture, selects a desired alert tone (step S72, FIG. 2A). An "Enter" button included in the function button area 52 is used to enter an item selected on each setting picture; when this button is pressed, the next picture appears on the display 54.

In practice, however, it is extremely difficult for the user of the handy phone to accurately memorize all management numbers assigned to a particular function each. It follows that every time the answer of the step S62, FIG. 1A, is N0, the user must input another management number. For example, if a hundred different function items are present, then the user must repeat the steps S61 and S62, FIG. 1A, a hundred times in the worst case.

As stated above, to call a desired function by inputting a management number, the user must memorize all management numbers. As for a function not memorized, the user must repeatedly operate the buttons a number of times.

Figure 4:
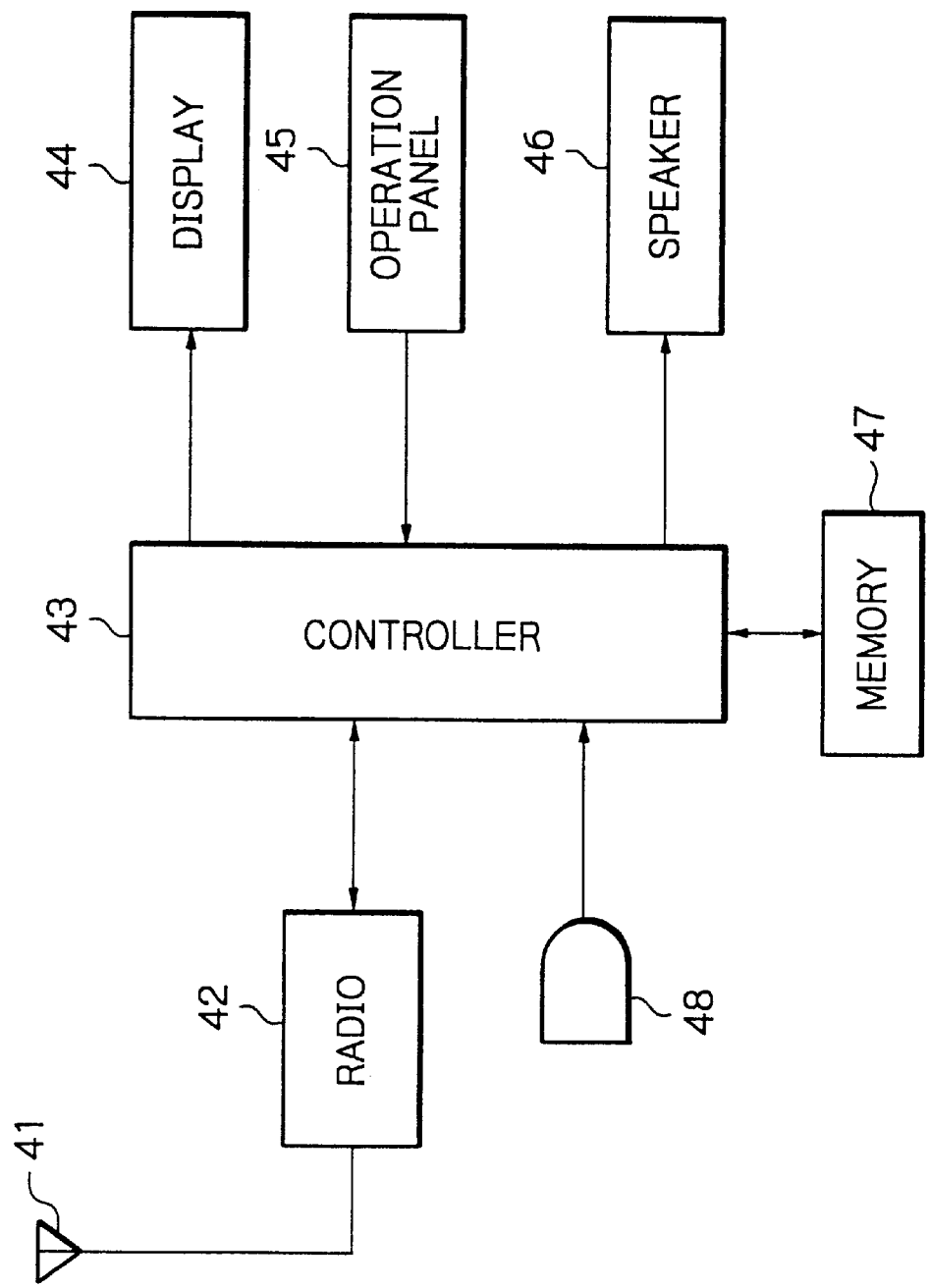
FIG. 4 is a block diagram schematically showing a handy phone embodying the present invention.

Referring to FIG. 4, a handy phone embodying the present invention is shown and includes a transmission/receipt antenna 41. The antenna 41 is connected to the previously mentioned controller 43 via a radio section 42. The radio section 42 executes demodulation and other conventional processing with a radio wave come in through the antenna 41. The resulting speech is output via a speaker 46. Also, the radio section 42 performs demodulation and other conventional processing with a speech input via a microphone 48. The resulting radio wave is sent via the antenna 41.

The controller 43 includes control circuitry for controlling the various sections of the handy phone. The memory 47 also mentioned earlier stores various data including data each corresponding to a particular function item. The controller 43 includes a plurality of keys corresponding to the buttons 51, FIG. 3. The controller 43 reads, e.g., data for setting a function item out of the memory 47 in accordance with the manipulation of an operation panel 45 including the buttons 51 and displays them on a display 44. The display 44 is implemented by, e.g., an LCD (Liquid Crystal Display) for displaying various information under the control of the controller 43.

Figure 5:
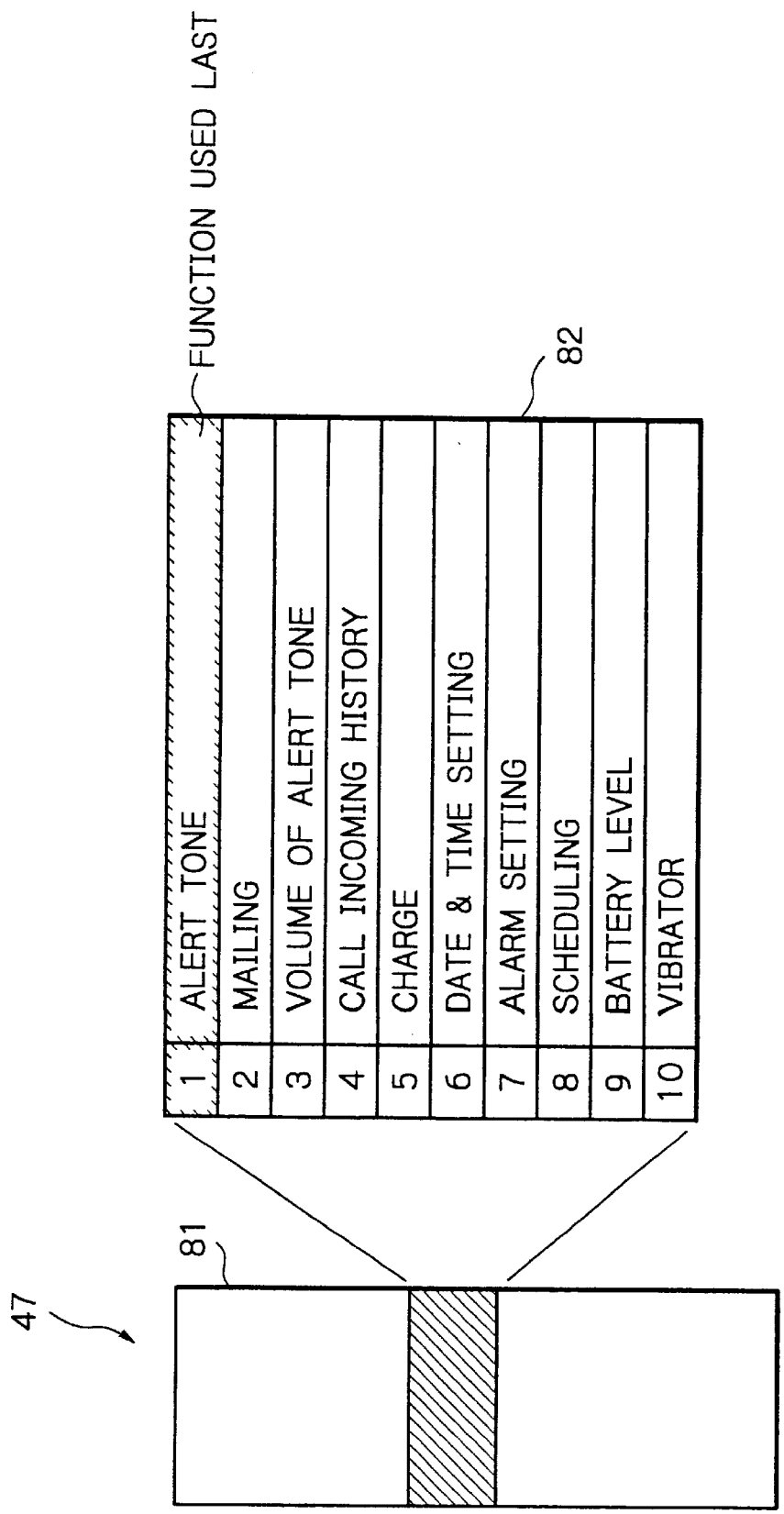
FIG. 5 shows a table stored in a memory included in the illustrative embodiment and listing a specific function history.

How the illustrative embodiment stores a function history in the memory 47 will be described with reference to FIG. 4 and 5. Assume that the memory 47 stores n functions used in the past at maximum, and that n is "10" by way of example. As shown in FIG. 5, the memory 47 has a storage area 81 part of which is assigned to a table 82 listing function history data. Specifically, the table 82 is capable of listing data relating to n functions. The latest data is input at the top of the table 82 (entry #1) at all times. When the table 82 becomes full of n function data, the oldest data (entry #n) is deleted. If a function identical with any one of the functions listed in the table 82 is input, the new function is stored while the old function is deleted. The n function data are therefore different from each other at all times.

Figure 6:
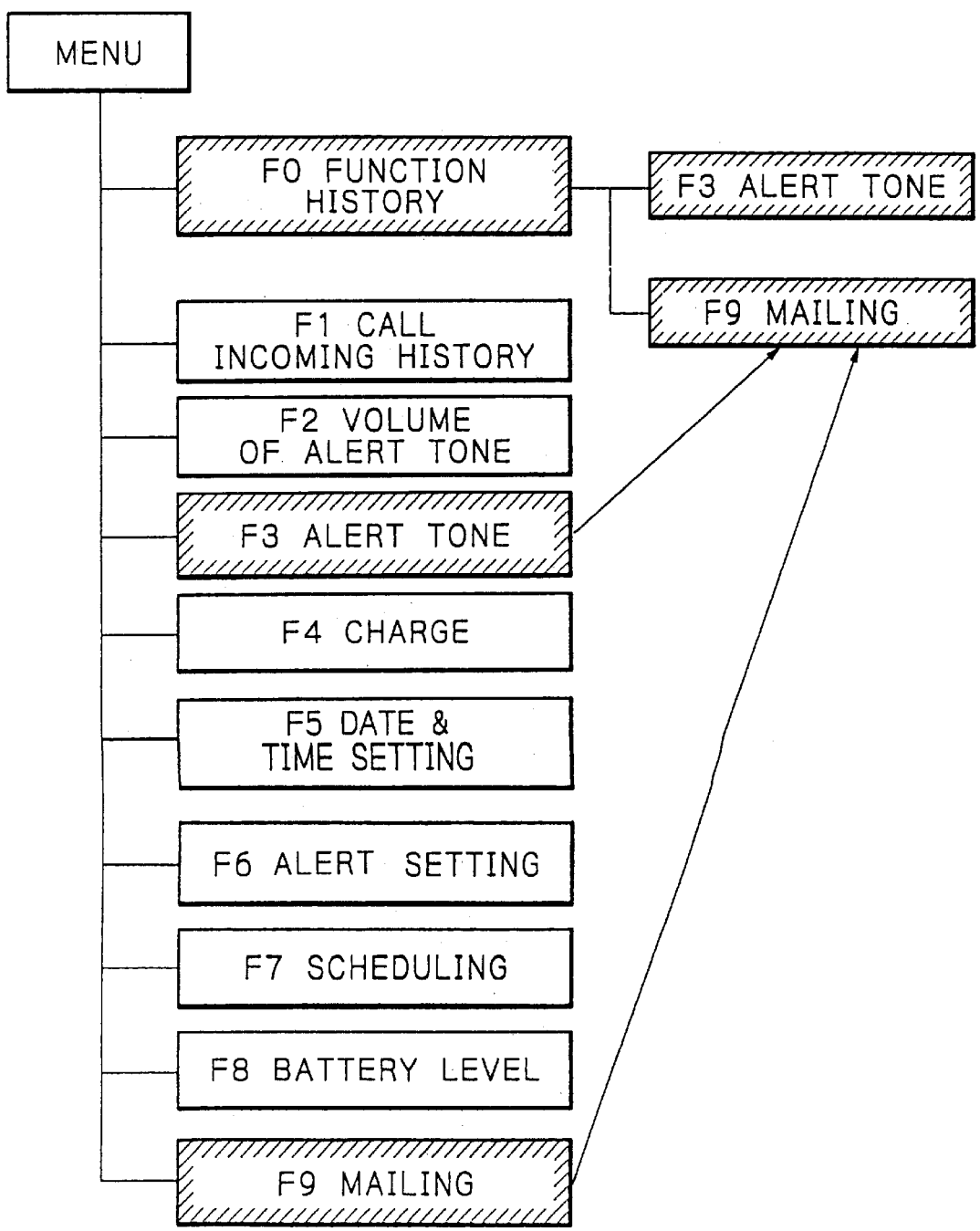
FIG. 6 is a view showing a specific menu calling method unique to the illustrative embodiment.

Reference will be made to FIG. 6 for describing a menu-based function calling procedure unique to the illustrative embodiment. A menu refers to a list of function items; the menu shown in FIG. 6 lists ten different function items. Assume that the user presses the button "F", FIG. 3, when the handy phone is in a stand-by state with a picture shown in a step S21 in FIG. 7 appearing. Then, a function item list shown in a step S74 of FIG. 2B appears on the display 44. Because the display 44 cannot show all the function items together, the user selects one of function items F0 through F9 by scrolling the display 44.

As for scrolling, assume a picture shown in a step S75 of FIG. 2B. Then, the user may sequentially scroll the function items on the display 44 by using buttons "*" and "#", FIG. 3, causing a desired function item to be highlighted. The button "*" causes the next item to appear when pressed (e.g. items F3 and F4 in place of items F2 and F3), while the button "#" causes the previous item to appear when pressed (e.g. items F1 and F2 in place of items F2 and F3). The buttons "*" and "#" are also used to shift the highlighted portion representative of a function being selected. For example, while an item "Alert Tone" is highlighted on the display 44 (step S75, FIG. 2B), the user may select an item "Volume of Alert Tone" above the "Alert Tone" by pressing the button "#".

As for the function history, assume that the user used the functions F3 and F9 in the past. Then, the memory 47, FIG.

4, stores the functions F3 and F9 as a function history. As shown in FIG. 6, when the user calls a function history F0 included in the menu, only the functions F3 and F9 appear on the display 44. That is, the user can call a desired function setting picture without scanning the functions F0 through F9 all over again, i.e., by searching the functions F3 and F9 only.

A more specific operation of the illustrative embodiment will be described with reference to FIG. 6. As shown, the menu functions F0 through F9 are assigned. Assume that the user used the alert tone selecting function F3 and mailing function F9 in the past desires to use the mailing function F9 again. Then, the user can call the mailing function F9 by the following simple operation.

While the handy phone is in a stand-by state, as shown in the step S21 of FIG. 7 which will be described later, the user presses the button "F", FIG. 3. As a result, a function item selecting picture appears, as shown in a step S22 of FIG. 7 which will also be described later. Because the function history function is position at the top of the menu, it appears first without any scrolling and is highlighted. When the user, watching the menu, presses the "Enter" button, FIG. 3, the function history listing the functions F3 and F9 is called. As a result, only the functions F3 and F9 are displayed. In this condition, by pressing the button "*", FIG. 3, once, the user can select the mailing function F9. It is possible with the conventional handy phone, too, to call a menu by pressing the button "F" while the handy phone is in a stand-by state. However, because the desired function F9 is listed at the bottom of the menu, the user intending to use the function F9 must press the button "*" nine consecutive times.

While the menu has been shown and described as listing only ten function items, a far greater number of function items exist in practice. In this sense, the function history function is successful to reduce the number of times of operation of the buttons to a considerable degree.

Figure 7:
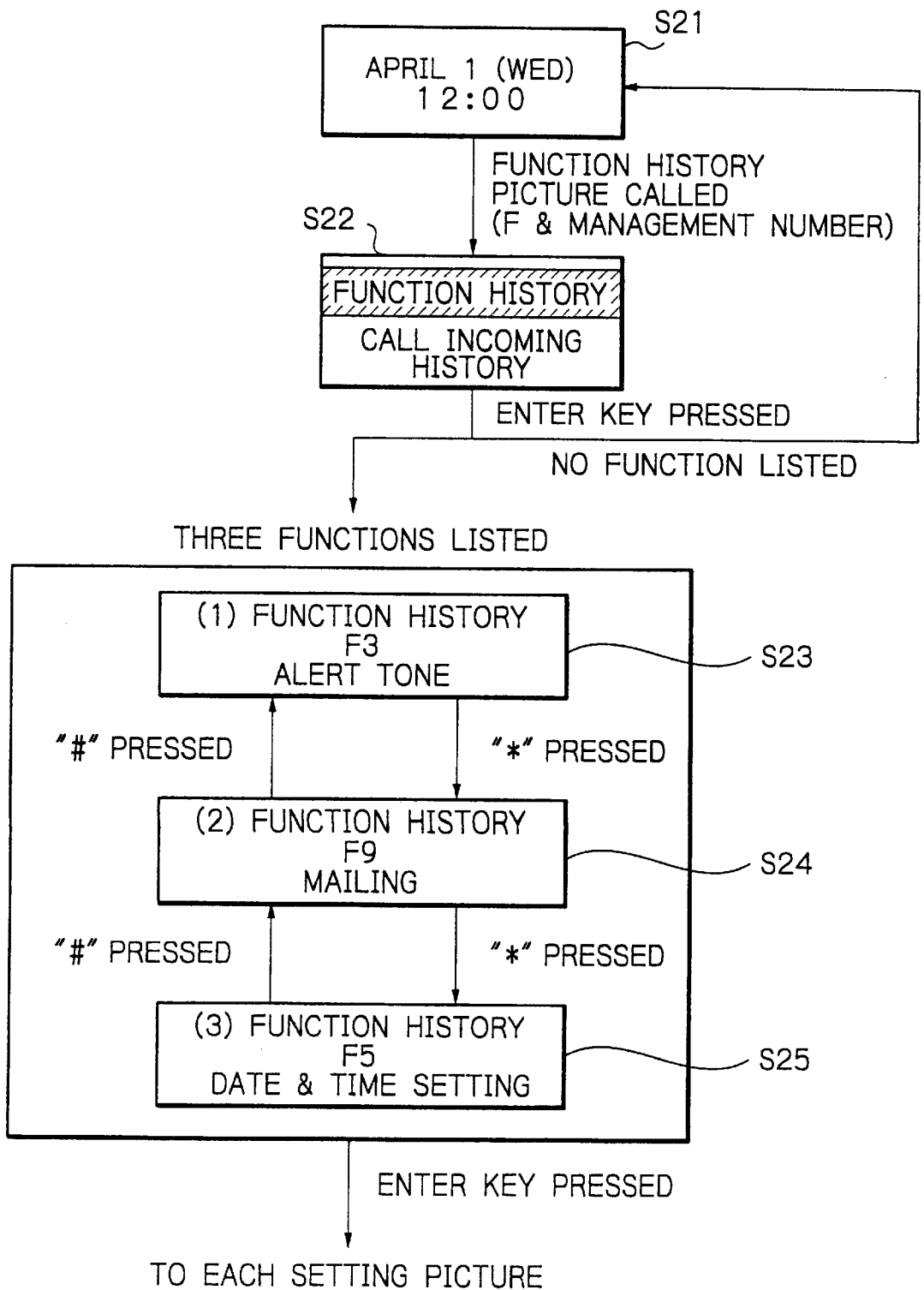
FIG. 7 is a flowchart showing a specific function history calling method also unique to the illustrative embodiment.
Figure 8:
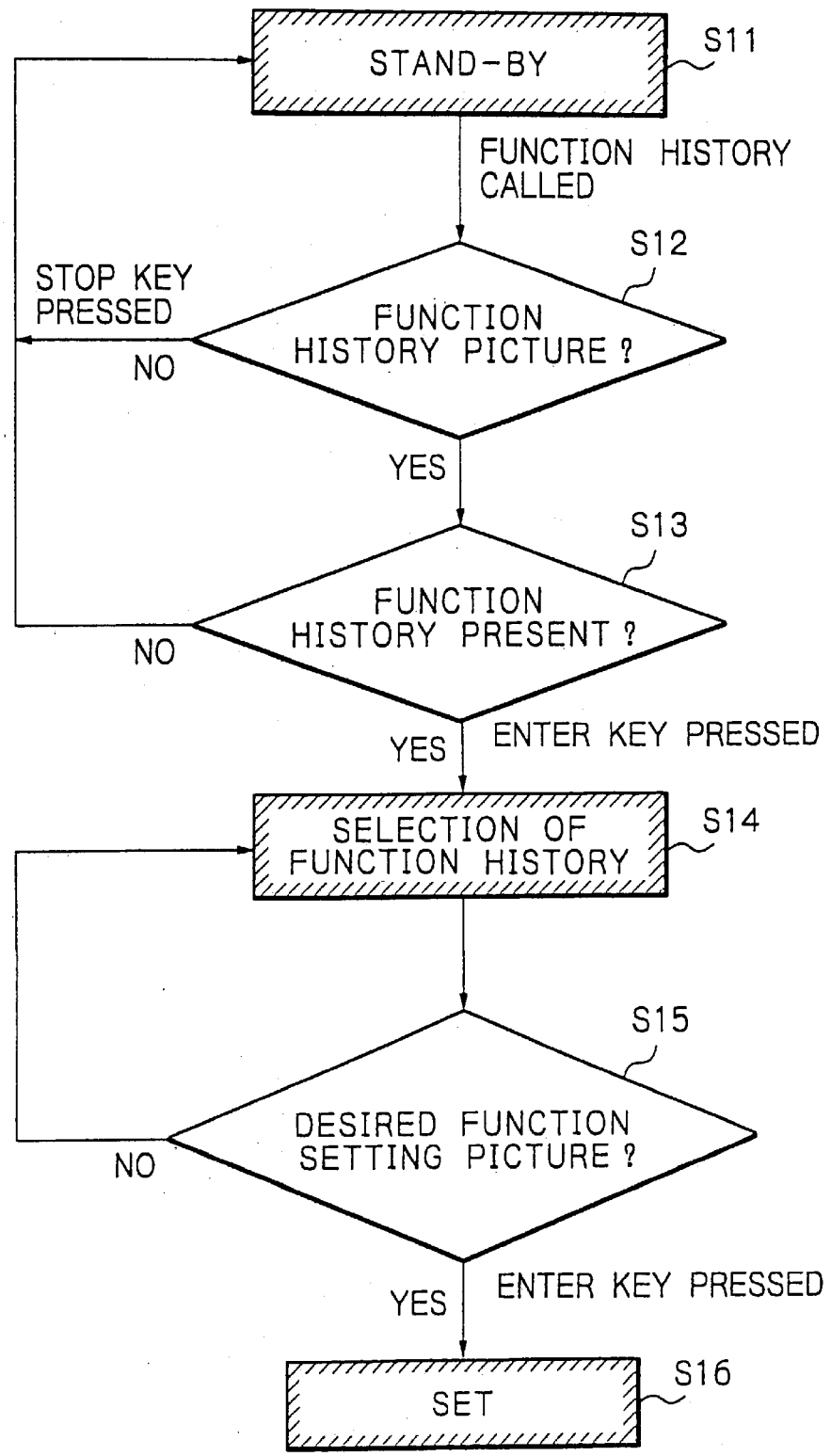
FIG. 8 is a flowchart showing a procedure for calling a desired function in the illustrative embodiment.

Reference will be made to FIGS. 6 through 8 for describing how the function history unique to the illustrative embodiment is called.

First, assume that the function history lists three different items, i.e., alert tone setting F3, date and time setting F5, and mailing F9. As shown in FIG. 21, while the handy phone is in a stand-by state with a picture shown in a step S21 being displayed, the user presses the button "F", FIG. 3, (call using a menu) or presses the buttons "F" and "0" (call using a management number). The user then determines whether or not the resulting picture is the function history picture (step S12, FIG. 8). If the answer of the step S12 is YES, the user presses a preselected enter button; if otherwise (N0, step S12), the user presses a preselected stop button. In this case, because the function history is assumed to list three different items, the operation advances from the step S12 to a step S14, skipping a step S13. A specific item to be displayed in the step S14 is shown in a step S23 of FIG. 7. In the illustrative embodiment, the item to be displayed first in the step S14 is the function used last. The user may press the button "*" or "#", FIG. 3, in order to scroll the picture of the step S23 to a picture of a step S24 or a picture of a step S25, as desired. When a desire function appears, the user presses the preselected enter key in order to see a setting picture relating to the desired function.

As stated above, the illustrative embodiment stores the function history listing functions which the user used in the past. Therefore, the user intending to use the same function again should only scan only the functions listed in the function history. It follows that a step S15 shown in FIG. 8 should only be repeated ten times at maximum corresponding to the maximum number of functions listed in the function history. By contrast, the conventional procedure forces the user to repeat the step S62, FIG. 1A, a hundred times at maximum.

On the other hand, if no functions are listed in the function history (N0, step S13), the operation returns to the step S11.

Figure 9:
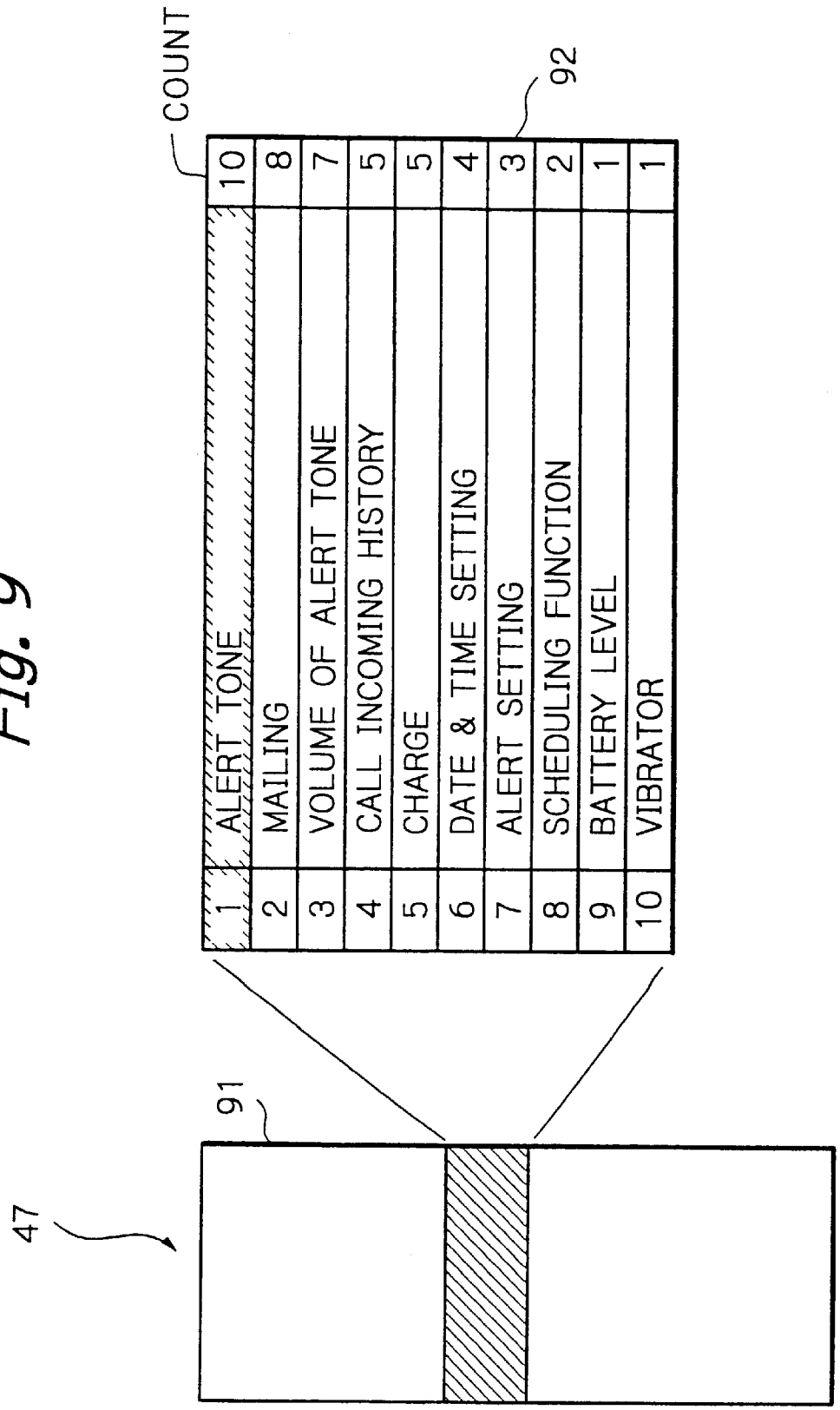
FIG. 9 shows a modified function history stored in the memory.

FIG. 9 shows a modified procedure for storing the function history in the memory 47. As shown, the memory 47 has a storage area 91 part of which is assigned to a table 92 for storing function history data. The table 92 is different from the table 82 of FIG. 5 in that it includes an additional column for storing counts entry by entry. The count of each function item is incremented by 1 (one) every time the function item is used, the initial count being zero. That is, while the table 82 of FIG. 5 updates the entire functions, the table 92 of FIG. 9 simply increments the counts.

When any one of the counts of the n (10 in this case) entries listed in the table 92 is updated, the modified procedure rearranges the n entries in the decrementing order of the count. If a group of entries identical in count with the above updated entry exists, then the n entries are rearranged such that the updated entry heads the above group.

Further, assume that the table 92 overflows when a new entry is registered thereat, and that the count ("1") of the new entry coincides with the count (which may not be "1") of the entry listed at the bottom of the table 92. Then, the entry existing in the table 92 is deleted. If the count of the entry existing in the table 92 is "2" or above, the new entry is discarded.

The above modified procedure allows the user to readily call functions to be used often. In a function history picture, the names of the functions appear together with the numbers assigned thereto in the decrementing order of the count.

Figure 10:
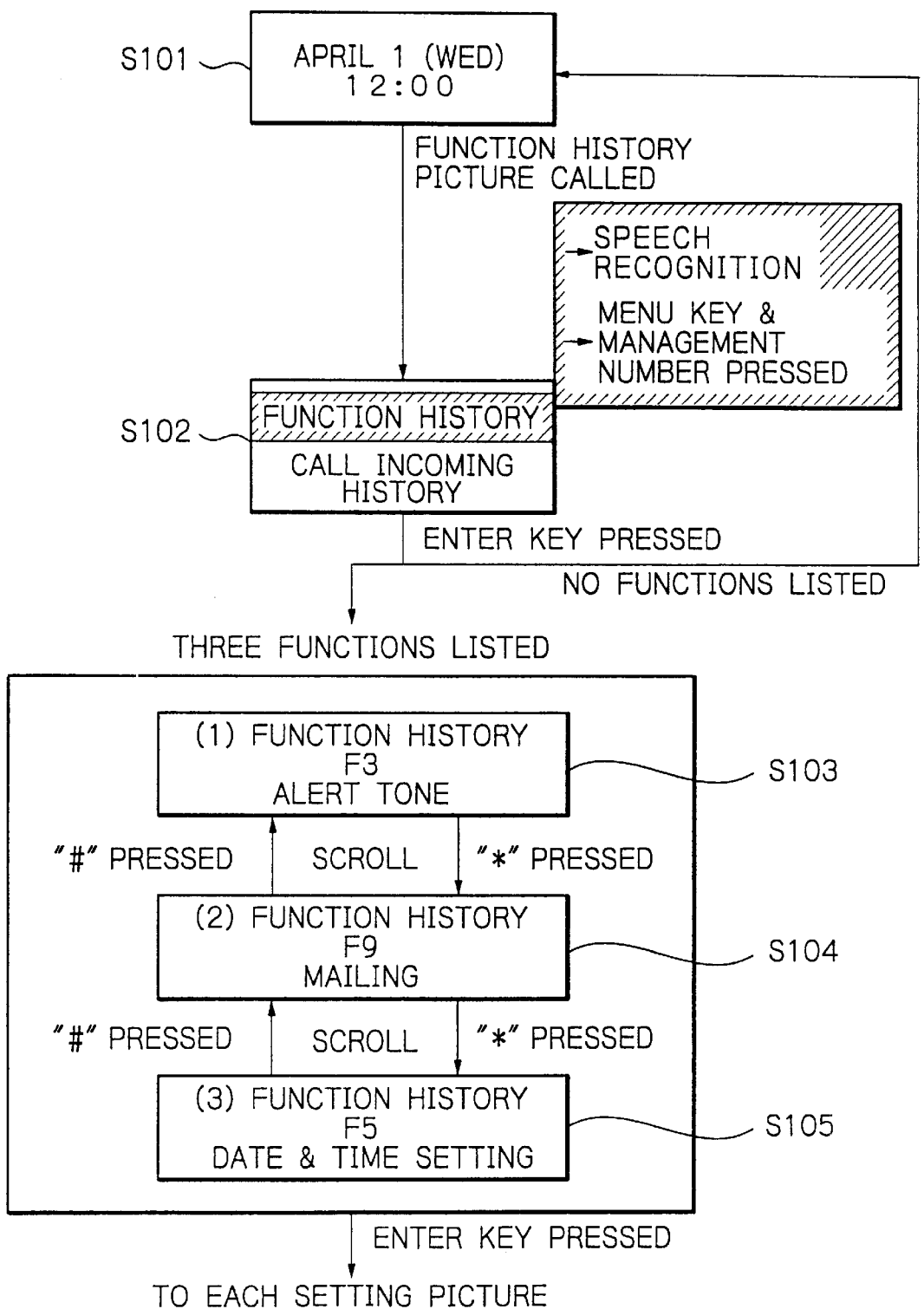
FIG. 10 is a flowchart showing a modified function history calling method.

FIG. 10 shows a modification of the method of calling the function history. As shown, when the handy phone is in a stand-by state with a picture shown in step S101 appearing on the display, the user presses the button "F", FIG. 3, and then the numeral button corresponding to a desired function. As a result, a function history picture shown in a step S102 appears on the display.

Speech recognition is another possible implementation for calling a desired function. Specifically, the user may input a speech indicative of a desired function via the microphone 48, FIG. 4, in which case the controller 43 will recognize the speech and display the function. Alternatively, a menu key may be substituted for the button "F", FIG. 3, in which case the user will press the menu key and then the numeral button corresponding to a desired function. Further, use may be made of the hierarchical "item" and "subitem" structure described with reference to FIGS. 1A, 1B, 2A and 2B.

In the step S22 of FIG. 7 and the step S75 of FIG. 2B, the function being selected is highlighted. Alternatively, the function being selected may be parenthesized, headed by a dot or similar mark, or displayed alone.

In each of the steps S23 through S25 of FIG. 7, a single function is displayed in a single picture. Alternatively, the function items may be displayed in layers in a single picture, as shown in FIG. 2B, or all the function items may be displayed together.

In summary, in accordance with the present invention, a handy phone stores functions called by the user of the phone in the past in the form of function history data. The history data allow the user to call the same function simply by pressing keys indicated by a picture. This successfully reduces the number of times that the user should press buttons, and allows the user to be easily accustomed to the operation of the phone.

Moreover, the user should only memorize a simple method of calling the function history data and should only operate the phone while watching menu pictures to appear after the call of the function history data. The user therefore does not have to memorize all the management numbers each being assigned to a particular function.

Various modifications will become possible for those skilled in the art after receiving the teachings of the present disclosure without departing from the scope thereof.

What is claimed is:

1. A handy phone comprising:
   menu picture displaying means for displaying a plurality of function names representative of a particular function each in a form of a menu;
   inputting means for inputting information designated by a user of said handy phone;
   function name setting entering means for allowing the user to select one of the function names appearing on the menu picture and enter one function name on said inputting means;
   function setting picture calling means for calling a function setting picture corresponding to the function name selected and entered by the user;
   function history storing means for storing in a memory the function names attached to functions used by the user in the past and a function setting picture corresponding to said function names;
   function history displaying means for displaying in the menu picture the function names of the functions stored in the memory as function history data;
   function history setting picture calling means for displaying, when the user selects and enters one of the function names of the function history data appearing in the menu picture on said inputting means, a function setting picture corresponding to said one function name, said function history storing means stores the function history data in a form of a table and comprises:
   recording means for recording how many times an individual function corresponding to one of the function names registered at said table is used in an entry corresponding to said one function name, a count being "1" when said individual function is registered for the first time;
   updating means for incrementing the count of the individual function by 1; and
   classifying means for rearranging, after said updating means has updated the count, the entries in a decrementing order of the count and
   when the count of the entry updated by said updating means is coincident with a count of an entry or entries existing in said table, said classifying means rearranges the entries such that said entry updated is positioned at a head of said entry or said entries existing in said table.

2. A handy phone as claimed in claim 1, wherein when a new entry is to be registered at said table and if a number of entries existing in said table has reached a preselected upper limit, said function history displaying means replaces the entry positioned at a bottom of said table with said new entry if the count of said entry positioned at the bottom of said table. is "1" or discards said new entry if the count of said entry positioned at the bottom of said table is "2" or above.

3. A handy phone as claimed in claim 2, wherein said function history storing means stores the function history data in a preselected hierarchical structure derived from significance of functions, said function history displaying means displaying said function history data in said preselected hierarchical structure.

4. A handy phone as claimed in claim 2, wherein said function history displaying means displays the function history data by arranging the function names in the decrementing order of the count.

5. A handy phone as claimed in claim 4, wherein said function history storing means stores the function history data in a preselected hierarchical structure derived from significance of functions, said function history displaying means displaying said function history data in said preselected hierarchical structure.

6. A handy phone as claimed in claim 1, wherein said function history displaying means displays the function history data by arranging the function names in the decrementing order of the count.

7. A handy phone as claimed in claim 6, wherein said function history storing means stores the function history data in a preselected hierarchical structure derived from significance of functions, said function history displaying means displaying said function history data in said preselected hierarchical structure.

8. A handy phone as claimed in claim 1, wherein said function history storing means stores the function history data in a preselected hierarchical structure derived from significance of functions, said function history displaying means displaying said function history data in said preselected hierarchical structure.

9. A handy phone as claimed in claim 1, wherein when a new entry is to be registered at said table and if a number of entries existing in said table has reached a preselected upper limit, said function history displaying means replaces the entry positioned at a bottom of said table with said new entry if the count of said entry positioned at the bottom of said table is "1" or discards said new entry if the count of said entry positioned at the bottom of said table is "2" or above.

10. A handy phone as claimed in claim 9, wherein said function history storing means stores the function history data in a preselected hierarchical structure derived from significance of functions, said function history displaying means displaying said function history data in said preselected hierarchical structure.

11. A handy phone as claimed in claim 9, wherein said function history displaying means displays the function history data by arranging the function names in the decrementing order of the count.

12. A handy phone as claimed in claim 11, wherein said function history displaying means displays the function history data by arranging the function names in the decrementing order of the count.

13. A handy phone as claimed in claim 12, wherein said function history storing means stores the function history data in a preselected hierarchical structure derived from significance of functions, said function history displaying means displaying said function history data in said preselected hierarchical structure.

14. A handy phone as claimed in claim 11, wherein said function history storing means stores the function history data in a preselected hierarchical structure derived from significance of functions, said function history displaying means displaying said function history data in said preselected hierarchical structure.

15. A handy phone as claimed in claim 1, wherein said function history storing means stores the function history data in a preselected hierarchical structure derived from significance of functions, said function history displaying means displaying said function history data in said preselected hierarchical structure.

16. A handy phone as claimed in claim 1, wherein said function history storing means stores the function history data in a form of a table and shifts, when a new function is to be registered, entries listed in said table by one entry downward, discards an entry shifted below a lower limit of said table, and registers an centry corresponding to said new function at a head of said table, said function history displaying means displaying the function names in the menu picture in an order in which the entries are listed in said table.

17. A handy phone as claimed in claim 16, wherein said function history storing means stores the function history data in a preselected hierarchical structure derived from significance of functions, said function history displaying means displaying said function history data in said preselected hierarchical structure.

* * * * *